United States Patent [19]

Müller et al.

[11] 4,404,106
[45] * Sep. 13, 1983

[54] FILTER APPARATUS AND A METHOD OF CLEANING FILTER ELEMENTS THEREOF

[75] Inventors: Hans Müller, Erlenbach; Bruno Guazzone, Rapperswil, both of Switzerland

[73] Assignee: Chemap AG, Maennedorf, Switzerland

[*] Notice: The portion of the term of this patent subsequent to Oct. 28, 1997, has been disclaimed.

[21] Appl. No.: 155,484

[22] Filed: Jun. 2, 1980

Related U.S. Application Data

[60] Division of Ser. No. 77,088, Sep. 19, 1979, Pat. No. 4,276,166, which is a division of Ser. No. 11,950, Feb. 13, 1979, Pat. No. 4,230,576, which is a continuation of Ser. No. 899,176, Apr. 24, 1978, abandoned.

[30] Foreign Application Priority Data

May 9, 1977 [CH] Switzerland ............... 5738/77

[51] Int. Cl.³ .................................... B01D 29/02
[52] U.S. Cl. .......................... 210/772; 210/797
[58] Field of Search ............ 210/772, 791, 797, 332, 210/798, 325, 327

[56] References Cited

U.S. PATENT DOCUMENTS

| | | | |
|---|---|---|---|
| 1,219,796 | 3/1917 | Atkins | 210/327 |
| 1,510,568 | 10/1924 | Sweetland | 210/327 |
| 3,393,262 | 7/1968 | Durso et al. | 210/791 X |
| 3,397,783 | 8/1968 | Pearce | 210/791 X |
| 3,578,163 | 5/1971 | Warning | 210/327 X |
| 3,680,702 | 8/1972 | Weinstein | 210/798 |
| 3,985,656 | 10/1976 | Arvanitakis | 210/327 X |

*Primary Examiner*—John Adee
*Attorney, Agent, or Firm*—Michael J. Striker

[57] ABSTRACT

A filter apparatus has an elongated shaft, a plurality of filtering elements mounted on the shaft and spaced from one another in direction of elongation of the latter, and means for cleaning the filtering elements. The cleaning means includes a source of cleaning medium under elevated pressure and a plurality of nozzle elements communicating with this source. The nozzle elements face toward surfaces of filtering material provided on the filter elements and are turnable relative to these surfaces. The cleaning medium is ejected from the nozzle elements at a pressure between substantially 5 and 100 bar toward the surfaces of the filtering material of the filter elements so that the cleaning medium removes a cake deposited during a filtering process from the surfaces of the filtering material and thereupon also cleans the filtering material of the filter elements.

10 Claims, 2 Drawing Figures

FILTER APPARATUS AND A METHOD OF CLEANING FILTER ELEMENTS THEREOF

CROSS-REFERENCE TO RELATED APPLICATION

This application is a division of application Ser. No.: 77,088 filed Sept. 19, 1979 now U.S. Pat. No. 4,276,166 which in turn is a division of application Ser. No. 11,950, filed Feb. 13, 1979 now U.S. Pat. No. 4,230,576 which in turn is a continuation of application Ser. No. 899,176 filed on Apr. 24, 1978, abandoned.

BACKGROUND OF THE INVENTION

The present invention relates to a method and apparatus for cleaning filter elements of a filter apparatus. More particularly, it relates to a method and apparatus for cleaning filter elements provided with a filter material upon a surface of which a cake is deposited during a filter process, particularly in a centrifugal filter after alluvial filtration of coal in flowable state.

Alluvial filters have been used for filtration of coal in flowable state. Such a filter has a hollow shaft and a plurality of horizontal plates mounted on the shafts and spaced from one another in direction of elongation thereof. The hollow shaft and the plates are accommodated in a pressure vessel. The operation of this filter is generally satisfactory. In dependence upon the origin of the coal, as well as upon the utilized filter aids, a cake is deposited during a filtering process on the filtering elements and forms a mass which is more or less difficult to be removed. In many cases the complete removal of this mass is so difficult that in short time the filter must be opened and the filter material of the filter elements must be mechanically or hydraulically cleaned.

It has been known to utilize spraying nozzles in a centrifugal filter apparatus for removal of a filter cake. In the Swiss patent 333,492 a filter apparatus is disclosed, in which nozzle elements supply fluid medium for cleaning the filter elements. In accordance with this patent, the filter cake is washed off by the fluid medium. In accordance with a method disclosed in the Swiss patent 402821 a solvent in a vapor phase is pressed through the filter cake. A liquid is produced during partial condensation of the vapors in the interior of the cake and washes away the cake from inside. The solvent in the vapor phase is supplied from outside of the filter vessel or the solvent is vaporized inside the filter. An arrangement for vaporization of the solvent is not disclosed.

A disadvantage of the above-mentioned method of cleaning by means of fluid medium is that it always requires very much solvent for washing away the filter cake. Moreover, by spraying the fluid toward the cake the latter is only being eroded but not removed, and the filter material of the filter elements is not cleaned. Generation of solvent vapors inside or outside the filter vessel requires expensive arrangements and is not suitable for removal of the filter cake and cleaning of the filter material.

SUMMARY OF THE INVENTION

Accordingly, it is an object of the present invention to provide a filtering apparatus and a method of cleaning filter elements thereof, which avoid the disadvantages of the prior art.

More particularly, it is an object of the present invention to provide a method and an arrangement in accordance with which an erosion of a filter cake, a removal of the filter cake, and cleaning of the filtering material of the filter elements can be performed with utilization of a smaller quantity of a cleaning medium, as compared with the known methods and arrangements.

In keeping with these objects, and with others which will become apparent hereinafter, one feature of the present invention resides in a method of cleaning filter elements in accordance with which a cleaning medium is supplied to nozzle elements and ejected from the latter at a pressure between substantially 5 and 100 bar toward surfaces of a filtering material of filter elements so that the cleaning medium issuing from the nozzle elements under the pressure removes the cake from these surfaces and thereupon also cleans the filtering material of the filter elements. When the filter elements are cleaned in accordance with such a method, it suffices to provide a small quantity of the cleaning medium, and at the same time the filter cake is eroded, it is removed from the filter elements, and the filtering material is cleaned by the cleaning medium.

Another feature of the present invention is that a filter apparatus includes means for cleaning filter elements, which includes a source of cleaning medium under elevated pressure and a plurality of nozzle elements communicating with the source and turnable relative to surfaces of a filtering material of the filter elements, so that the cleaning medium issuing from the nozzle elements under the elevated pressure removes the cake from these surfaces and thereupon also cleans the filter material of the filter elements.

In accordance with a further feature of the present invention a filtrate or an inert gas may be used as the cleaning medium.

In accordance with a still further feature of the present invention a manifold, conduits communicating with the manifold, and nozzle elements mounted on the conduits may turn about an axis, and a shaft supporting the filter elements may rotate about a further axis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
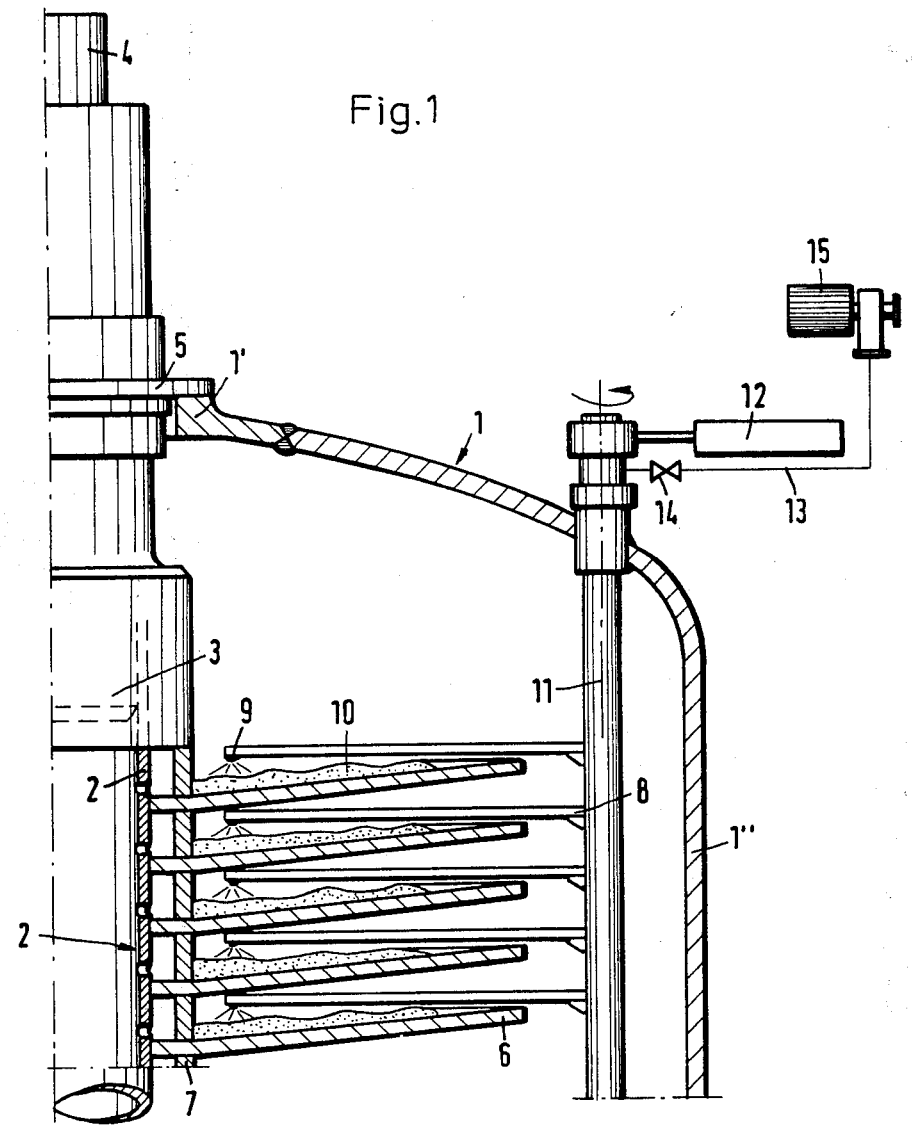
FIG. 1 is a view showing a partially sectioned filter apparatus in accordance with the present invention.

A filter apparatus in accordance with the present invention and a method of cleaning filter elements thereof are illustrated in the drawing. The filter apparatus has a central shaft which is identified by reference numeral 2 and includes a hollow portion 2' and a driving portion 3. The shaft 2 is accommodated in a pressure vessel identified in toto by a reference numeral 1. Drive means 4 are provided outside the pressure vessel 1. The shaft 2 is mounted in a cover 1' of the pressure vessel 1 by means of a bushing 5 in known manner.

A plurality of filter elements 6 are mounted on the shaft 2 and spaced from one another in direction of elongation thereof by means of spacer rings 7. The shaft 2 and the filter elements 6 together form a filter pack.

Figure 2:
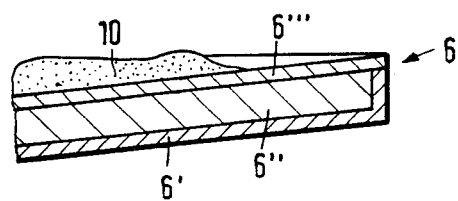
FIG. 2 is a view showing a fragment of a filter element of the filter apparatus shown in FIG. 1.

A manifold 11 is rotatably mounted in a space between the filter pack and a wall 1" of the pressure vessel 1. A plurality of conduits or arms 8 extend from the manifold 11 toward and above the filter elements 6. As shown in FIG. 2, each of the filter elements 6 is dish-shaped and has a hollow body portion 6' which is filled with spacer members 6". A filtering material is arranged above the spacer members 6".

A spraying nozzle 9 is mounted on an end portion of each of the arms 8. The manifold 11 is turnable in both directions and operatively connected with drive means 12. The manifold 11 together with the arms 8 and the nozzles 9 can be moved either by hand or by motor-operated drive means 12.

The drive means 4 is operative for rotation of the shaft 2 about an axis which may be substantially parallel to an axis about which the drive means 12 rotates the manifold 11 together with the arms 8 and the nozzles 9. The manifold 11 communicates with a supply conduit 13 provided with a valve. Means 15 is also provided for imparting a pressure to a cleaning medium supplied through the supply conduit 13. Any known means can be used for this purpose, for example a pump.

During a filtering process, a filter cake 10 is deposited on the filtering material 6''' of the filter elements 6. In order to clean the filter elements 6, the shaft 2 is slowly rotated by the drive means 4. Simultaneously, the valve 14 is opened and a cleaning medium is supplied through the supply conduit 13 to the manifold 11 under pressure. The pressure corresponds to between substantially 5 and 100 bar and can be adjusted by the high pressure pump 15. Any suitable cleaning medium can be used for cleaning the filter elements 6. For instance, a filtrate may also be used as a cleaning medium. On the other hand, an inert gas may be used as a cleaning medium for cleaning the filter elements 6. The filtrate atomized by high speed is supplied through the arms 8 and ejected through the nozzles 9 onto the filter cake 10 which is deposited on the filtering material 6''' of the filter elements 6. First, the filter cake 10 is eroded by the cleaning medium. Thereupon under the action of the pressure of the cleaning medium the filter cake 10 is removed from the filtering material 6''' of the filter element 6 and the filtering material 6''' is cleaned from the filter cake 10. It is also possible to supply the cleaning medium under a relatively low pressure so as to erode the filter cake 10 in the initial period of the cleaning process, and to thereupon increase the pressure of the cleaning medium so as to remove the filter cake 10 from the filter elements 6 and to clean the filtering material 6''' of the filtering element 6. The uniformity of the cleaning process is attained not only by rotation of the filter elements 6, but also by forward and reverse turning movements of the manifold 11 together with the arms 8 and the nozzles 9. Thereby the nozzles 9 during its turning movements overlap the entire upper surface of the filtering material 6''' of the filter elements 6 and fully clean the same. In order to quarantee the full removal of the filter cake 10, the speed of the shaft rotation is so increased that the remainder portions of the filter cake 10 are flung under the action of the centrifugal force against the wall 1" of the pressure vessel 1 and thereupon fall into a not-shown bottom from which they are removed.

The method and the arrangement in accordance with the present invention are preferably used for cleaning the filter elements of a filter apparatus for filtering a coal in flowable state wherein extreme requirements to temperatures and contamination are made.

It will be understood that each of the elements described above, or two or more together, may also find a useful application in other types of constructions differing from the types described above.

While the invention has been illustrated and described as embodied in a method of and arrangement for cleaning filter elements of a filter apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be secured by Letters Patent is set forth in the appended claims:

1. A method of cleaning substantially horizontal filter elements having a common vertical axis and provided with a filtering material upon an upper surface of which a cake is deposited during a filtering process and a closed lower surface, the method comprising the steps of providing nozzle elements having a further common vertical axis and horizontal arms located above the upper surface of the filtering material of the filter elements; supplying a cleaning medium to said nozzle elements; ejecting the cleaning medium from said nozzle elements at an adjustable elevated pressure towards said upper surface from above; rotating said filter elements about said first-mentioned axis during ejecting of the cleaning medium towards said upper surface under a desired elevated pressure; and turning the nozzle elements about said further axis relative to said upper surface during ejecting the cleaning medium toward said upper surface so that during the rotation and turning the entire upper surface is overlapped and thereby full removal of the cake from said surfaces and thereupon also full cleaning of the filter material of the filter elements are guaranteed.

2. The method as defined in claim 1, wherein said turning step includes turning said nozzle elements in two opposite directions.

3. The method as defined in claim 1, wherein said supplying step includes utilizing a filtrate as said cleaning medium.

4. The method as defined in claim 1, wherein said supplying step includes utilizing gas as said cleaning medium.

5. The method as defined in claim 4, wherein said gas is an inert gas.

6. A method as defined in claim 1, wherein said rotating and turning steps include rotating and turning about the axes which are substantially upright and parallel to one another.

7. A method of cleaning substantially horizontal filter elements having a common vertical axis and provided with a filtering material upon an upper surface of which a cake is deposited during a filtering process and a closed lower surface, the method comprising the steps of providing nozzle elements having a further common vertical axis and horizontal arms located above the upper surface of the filtering material of the filter elements; supplying a cleaning medium through and ejecting the cleaning medium from said nozzle elements to said surfaces from above so as to erode the cake deposited thereon; rotating said filter elements about said first-mentioned axis during ejecting of the cleaning medium toward said upper surface under a desired elevated pressure; turning said nozzle elements about said further axis relative to the surface during supplying of the cleaning medium toward the surface; and applying to said cleaning medium an adjustable elevated pressure so that said cleaning medium exits from said nozzle elements at a pressure between substantially 5 and 100 bar, whereby the cake is removed from said surface and the filtering material of the filter elements is cleaned.

8. The method as defined in claim 7; and further comprising performing said applying step subsequently to said supplying step.

9. A method as defined in claim 1, wherein said ejecting step includes ejecting the cleaning medium from said nozzle elements in a central region of said filter elements, close to the common vertical axis of the latter so that the cake is removed in direction from the central region of said filter elements outwardly to a periphery of the latter under the action of a centrifugal force.

10. A method of cleaning substantially horizontal filter elements having a common vertical axis and provided with a filter material upon an upper surface of which a cake is deposited during a filtering process, the method comprising the steps of providing nozzle elements having a further common vertical axis and located above the upper surface of the filtering material of the filter elements; supplying a cleaning medium to said nozzle elements; ejecting the cleaning medium from said nozzle elements at an adjustable elevated pressure towards said upper surface from above downwardly and in a central region of said filter elements which is close to the common vertical axis of the latter; rotating said filter elements about said first-mentioned axis during ejecting of the cleaning medium towards said upper surface under a desired elevated pressure so that the cake is removed in direction from the central region of said filter elements outwardly to a periphery of the latter under the action of a centrifugal force; and turning the nozzle elements about said further axis relative to said upper surface during ejecting the cleaning medium towards said upper surface so that during the rotation and turning the entire upper surface is overlapped and thereby full removal of the cake from said surfaces and thereupon also full cleaning of the filter material of the filter elements are guaranteed.

* * * * *